Jan. 28, 1964  H. W. BOOTHROYD  3,119,908
CAM OPERATED MICROSWITCH ACTUATOR
Filed Feb. 5, 1962

Howard W. Boothroyd
*INVENTOR*

United States Patent Office 3,119,908
Patented Jan. 28, 1964

3,119,908
CAM OPERATED MICROSWITCH ACTUATOR
Howard W. Boothroyd, Amherst, N.H., assignor to Sanders Associates, Inc., Nashua, N.H., a corporation of Delaware
Filed Feb. 5, 1962, Ser. No. 171,194
7 Claims. (Cl. 200—38)

This invention relates to a mechanical system in which an output member in the system is displaced through a predetermined maximum distance without regard to linear variations in displacement experienced by an input member.

More particularly, this invention relates to a constant stroke cam follower which is driven through a linkage system by an input cam, the linkage system transmitting a predetermined maximum displacement to the cam follower without regard to variations in the height of the input cam.

Specifically, this invention relates to a microswitch assembly in which the microswitch actuator is limited to a specific maximum displacement which displacement is transmitted via an input cam and compensating linkage system.

There has been an ever-increasing need for miniaturization to meet the demands of industry bent on reducing size and weight in order that the complex mechanisms currently being developed can be fitted in a reasonable space. The particular problems which gave birth to this invention deals with the fact that many of the microswitches of today can only be actuated by an actuation motion of a miniscale dimension. Many of these switches if when actuated are subjected to excessive actuator motion, it results in the ultimate destruction of the switch itself. More specifically, this continued actuation motion problem presented itself when a large bank of switches were to be actuated by means of an elongated rotary cam drum. The cam drum having a large number of protruding cam lobes affixed thereto. As the cam drum is rotated, the lobes are used to actuate a cam follower which in turn actuates the microswitch. In order to realize the magnitude of the problem, it is worthwhile noting at this time that the microswitches commonly utilized here cannot be depressed more than five thousandths (.005) of an inch past its actuated position without resulting in some damage or the complete destruction of the switch involved. It is not hard to imagine that when one is dealing with the many machine tolerances, bearing tolerances, and mounting tolerances involved that this .005 of an inch becomes an almost impossible dimension to hold. In order that the respective parts of this mechanism be manufactured with normal tolerances, the use of a compensating linkage system which is part of the subject of this invention was created. The linkage system and related microswitch and cam drum permits a considerable range of machine tolerances for all the parts.

It is therefore an object of this invention to provide a system in which the switches involved need not experience a multitude of adjustments to meet the environmental conditions brought about by varying tolerances.

Another object of this invention is to permit the free interchangeability of switches when the units involved are in the field.

A further object of this invention is to provide a switching assembly which may be pre-set and thereby facilitate switch replacement in the field.

Yet another object of this invention is to provide a compensating cam linkage system in which less severe tolerances may be sustained while providing an extremely accurate output movement from the cam follower assembly.

Yet another object of this invention is the elimination of any and all output variations as a function of certain input variations.

And yet another object of this invention is the provision of a novel compensating linkage whose output member can be given a predetermined output motion without regard to certain variations that arise at the input of the system.

The invention, both as to its arrangement and its mode of operation can be better understood from a perusal of the exposition which follows when considered in conjunction with the accompanying drawings in which.

Figures 1, 2, 3:
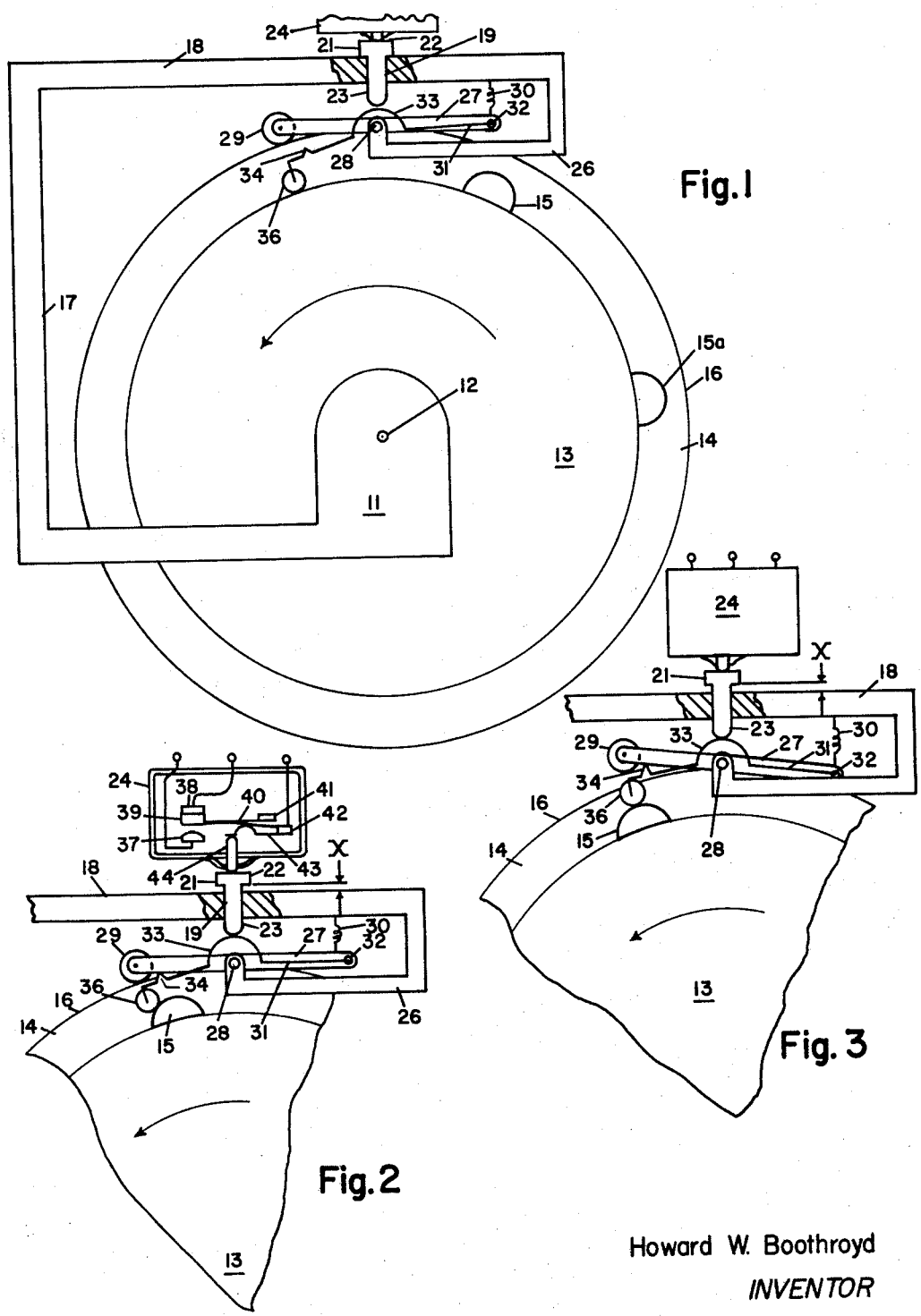
FIG. 1 depicts a schematic showing of one section of a cam drum and its related switch and linkage system.
FIG. 2 is a partial showing of the structure involved in FIG. 1 in which the linkage system is shown in a partially actuated condition.
FIG. 3 is an illustration similar to FIG. 2 wherein the linkage system is shown in another position of actuation.

Referring now to FIG. 1 with its schematic showing of one section of a cam drum and related switch and link system, a frame 11 rotatably supports rotary member or cam drum 13 on a rotary pivot point 12. On the cam drum 13 are mounted cam lobes 15 and 15a. Only two lobes have been shown; any number may be used. In fact, the more cam lobes involved the more acute is the problem of controlling the height of the cam lobes. Concentric with the rotary member or cam drum 13 is an annular guide member 14 whose function will be more fully described later. Integrally connected to the frame 11 is vertical support portion 17 which in turn has integrally connected thereto a horizontal support member 18. At the right hand end of the horizontal support member 18 is a guide opening 19 and protruding through the guide opening 19 is an output member, part or pin 21 with its associated output end portion 23 mounted in a sliding relationship with respect to the guide opening 19. The output member 21 having a flattened enlarged head portion 22 which is in contact with microswitch 24, the switch which is ultimately to be actuated. While the switch contacts within the microswitch 24 are not shown in FIG. 1, the switch used may be a switch of a type produced by the Hayden Switch Company of Waterbury, Connecticut, and more specifically, their microswitch model No. 6107. This switch will be more fully disclosed hereafter.

Integrally connected to the horizontal support member 18 is the linkage support member 26 which has mounted at its left end a pivotal support 28 which pivotal support in turn supports for rotary motion a first linkage member 27. At the left hand end of linkage support member of the first linkage member 27 is a rotatably mounted guide roller 29 which rolls on the guide surface 16 of the annular guide member 14. The first linkage member and its associated guide roller or follower 29 have connected at the right hand end of the linkage member 27, a bias spring member 30 which prime function is to bias the guide roller 29 on the guide surface 16 of the annular guide member 14.

At the right hand end of the first linkage member 27 is another pivotal pin connection 32 which functions as a pivotal support for the second linkage member 31 which second linkage member 31 is mounted for pivotal movement at its right end as viewed in FIG. 1.

The second linkage member 31 is further composed of three distinct portions. At the right hand end of the second linkage member 31 is a pivotal pin connection 32 which supports the second linkage member 31 for oscillatory motion with respect to the first linkage member 27. The center portion of the second linkage member 31 is characterized by the presence of an arcuate intermediate section 33. The radius of curvature of this arcuate portion 33 being constant over the entire length of the arc for purposes to be more fully described hereafter. Following the second linkage member 31 to the left as viewed in FIG. 1, there will be noted a small raised projection 34. While this raised projection 34 is schematically shown as being a small V-shaped section, it should be noted that while not shown in the drawings, this raised portion 34 may be constructed of any suitable adjustable element such as a screw which would pass through the second linkage member 31, which upon turning would raise or lower the height of the projection 34. At the far left hand end of the second linkage member 31, there is mounted for rotation a second linkage contact roller or follower 36 which rides on the surface of the rotary member or cam drum 13.

FIG. 1 represents a showing of the system wherein all components and elements are in passive condition in order that a better understanding of the invention be gained from the drawings.

Reference is now made to FIG. 2 and FIG. 3 in which FIG. 2 depicts the microswitch system in a fully actuated condition wherein the cam lobe involved has not fully passed under the second linkage contact roller 36. Referring now specifically to FIG. 2, it will be noted that upon rotation of the rotary member or cam drum 13 by some suitable outside motive force, the cam lobe 15 has advanced to a position such that the second linkage contact roller 36 has been cammed in an upward movement over the surface of the cam lobe 15.

It should be understood at this time that in order to permit a more complete understanding of the operation of this unit, the dimensions depicted are greatly exaggerated for purposes of getting greater clarity. With this thought in mind, it should be known that the cam lobe 15 while designed to give precisely the correct displacement to the second linkage contact roller 36 the inherent variations and dimensional tolerances brought about when the cam lobe 15 is affixed to the rotary member or cam drum 13 quite frequently destroys the precise dimensional height of the cam lobe 15.

Still referring to FIG. 2, it is seen that the second linkage contact roller 36 has not yet reached the crest of the lobe 15. At this very condition, it can be seen that the arcuate intermediate portion 33 has moved upwards and in doing so has contacted the output members end portion 23 and accordingly has displaced it through a dimension shown in FIG. 2 and characterized by the designation X.

At this time a brief description of the microswitch 24 would appear in order. The microswitch 24 is characterized by the presence of two contact members, the first electrical contact member 37 representing a normally ON condition and the second electrical contact member 38 representing a normally OFF position. The microswitch 24 functions as a snap acting switch wherein a leaf spring support 40 is integrally connected to a moveable contact member 39 which makes contact with either the first electrical conduit member 37 or as depicted in FIG. 2, an electrical contact is being made with the second electrical contact 38. The leaf spring support 40 is integrally connected to a support block 41 which in turn is fixed in relation the microswitch 24. A second support block 42 has integrally connected thereto a leaf spring 43 with an arcuate end portion which comes in contact with the leaf spring support 40 and a sliding pin 44. Any movement of the sliding pin 44 results in a flexure of the leaf spring 43 and this is transmitted through the leaf spring's arcuate end portion to the leaf spring support 40 which in turn moves the contact member 39 into contact with the first electrical contact or the second electrical contact depending on the direction of movement of the sliding pin 44.

Returning now to the operation of the linkage system and the state in which this system finds itself as depicted in FIG. 2, it has been noted that the output member 21 has been displaced through a distance X. This distance X being a measure of the maximum distance which may be transmitted to the sliding pin 44 of the microswitch 24 as was indicated earlier. If the sliding pin 44 is moved through a distance that exceeds five thousandths of an inch, the microswitch 24 and its respective contacts will be damaged or destroyed. Again, it should be noted that the microswitch 24 has been depicted in FIG. 2 in exaggerated proportions with respect to its actual size in order that a clear understanding of its operation can be made. As indicated above, the second linkaage contact roller 36 is about to approach the crest of the came lobe 15. At this point in the operation it will be seen in FIG. 2 that the raised projection 34 of the second linkage member 31 has just come in contact with the undersurface of the first linkage member 27. With the raised projection 34 just contacting the undersurface of the first linkage member 27 the distance between the center of guide roller 29 and the second linkage contact roller 36 becomes fixed. Any further upward movement of the second linkage contact roller 36 can in no ways change the center-to-center distance just noted. Accordingly, once this center-to-center distance becomes fixed, the distance X also becomes fixed and in order to change the dimension X it is only necessary to adjust the height of the left projection 34. In the manufacture of these units, this adjustment just described is required for each arm assembly due to manufacturing tolerances. However, after it is once made and locked, all arm assemblies become interchangeable without influencing the dimension distance X.

At this very instant the radius of curvature of the arcuate intermediate portion 33 coincides exactly with pivotal support 28. It will be seen that any further movement of the rotary member or cam drum 13 and its respective cam lobe 15 will force the second linkage member 31 and its related projection 34 to lift the guide roller 29 off the surface 16 of the annular guide member 14. This is exactly the condition which is depicted in FIG. 3.

Referring now more specifically to FIG. 3, it will be seen that the guide roller 29 has been lifted completely off of the guide surface 16. Of importance to note is that as a practical matter, the first linkage member 27 and the second linkage member 31 now move as a single unit and because of this, the radius of curvature of the arcuate intermediate portion 33 coincides exactly with the pivotal support 28. Any and all motion transmitted to the second linkage contact roller 36 can cause only a purely rotary motion of the first linkage member 27 and the second linkage member 31 and this pure rotary motion is about the pivotal support 28. In view of the fact that the output member and portion 23 is displaced only as a result of vertical movement of the arcuate intermediate portion 33, no further movement will occur to the output member 21 because the surface of the arcuate intermediate portion 33 is in pure rotational movement with respect to the output members and portion 23. The critical dimension X has therefore been maintained and it is seen that the linkage system herein described permits a variable input with a predetermined maximum output.

In view of the modifications which can be made, it is intended that the invention not be limited by the embodiment illustrated herein, but rather that the scope of the invention be construed in accordance with the appended claims.

What is claimed is:
1. In combination,
   a pin,
   a support member guiding the pin for reciprocating movement,
   and means for maintaining the translation of the pin constant with no increase of pressure thereon after the pin has been initially translated,
   said means comprising a movable body having an enlargement thereon of possible variable height,
a pair of intercalated levers between said body and pin,
a first lever oscillatable on a pivot perpendicular to the axis of the pin,
a second lever pivoted on said first lever and having a follower engageable with said movable body and the enlargement thereon,
said second laver having a projection thereon to engage and shift said first lever when the follower is moved by said enlargement, thereby effecting rotation of said first and second levers about the pivot,
said second lever having an arcuate portion concentric with the pivot in the shifted position of the second lever,
all whereby variations in angular displacement of the levers after initial translation of the pin, will have no effect in change of pressure of the second lever on the pin.

2. A linkage system including,
an input means,
an output member,
a first member,
said first member being pivotally supported,
a second member,
said second member pivotally supported on said first member,
said second member having a follower always in contact with said input means,
said second member having an arcuate intermediate portion,
said second member having a projection integral therewith,
said projection coming into abutting contact with said first member upon pivotal movement of said second member towards said first member,
said arcuate portion of said second member coming into contact with said output member when said input means comes in contact with said follower.

3. A constant stroke cam follower with variable input comprising,
an output part,
a cam means,
said cam means having possible variations in cam height with respect to said part,
linkage means cooperating with said cam means and said part which will only transmit a predetermined maximum displacement to said part without regard to variations in said cam height,
said linkage means including,
a first member,
said first member being pivotally supported,
a second member,
said second member pivotally supported on said first member,
said second member having a follower always in contact with said cam means,
said second member having an arcuate intermediate portion,
said second member having a projection integral therewith,
said projection coming into abutting contact with said first member upon pivotal movement of said second member towards said first member,
said arcuate portion of said second member coming into contact with said cam means when said cam means comes in contact with said follower.

4. A constant stroke cam follower mechanism with a variable input comprising,
a frame,
a rotary member mounted on the frame,
an output member,
said output member mounted in said frame for reciprocatable movement therein,
said rotary member including a cam mounted thereon,
a first member,
said first member pivotally supported on said frame,
a second member,
said second member pivotally supported on said first member,
said second member having a follower always in contact with said rotary member,
said second member having an arcuate intermediate portion,
said second member having a projection integral therewith,
said projection coming into abutting contact with said first member upon pivotal movement of said second member towards said first member,
said arcuate portion of said second member coming into contact with said output member when said cam on said rotary member comes in contact with said follower.

5. A constant stroke cam follower mechanism with a variable input comprising,
a frame,
a rotary member mounted on the frame,
an output member,
said output member mounted in said frame for reciprocatable movement therein,
said rotary member including a cam mounted thereon,
said rotary member having integral therewith a guide surface,
a first member,
said first member pivotally supported on said frame,
a second member,
said escond member pivotally supported on said first member,
said first member having a first follower which may contact said guide surface,
said second member having a second follower always in contact with said rotary member,
said second member having an arcuate intermediate portion,
said second member having a projection integral therewith,
said projection coming into abutting contact with said first member upon pivotal movement of said second member towards said first member,
said arcuate portion of said second member coming into contact with said output member when said cam on said rotary member comes in contact with said second follower.

6. A microswitch assembly comprising in combination,
a microswitch,
a microswitch actuator,
said microswitch actuator being mounted for reciprocatable movement,
a cam,
said cam having variations in cam height with respect to said microswitch actuator,
linkage means cooperating with said cam and said microswitch actuator which will only transmit a predetermined maximum displacement to said microswitch actuator without regard to variations in said cam height,
said linkage means including,
a first member,
said first member being pivotally supported,
a second member,
said second member pivotally supported on said first member,
said second member having a follower always in contact with said cam,
said second member having an arcuate intermediate portion,
said second member having an adjustable projection integral therewith, said projection coming into abutting contact with said first member upon pivotal movement of said second member towards said first member, said arcuate portion of said second member coming into contact with said microswitch actuator when said cam comes in contact with said follower.

7. A microswitch assembly comprising in combination,
a microswitch,
a microswitch actuator,
said microswitch actuator being mounted for reciprocatable movement,
a cam,
said cam having variations in cam height with respect to said microswitch actuator,
said cam having a guide surface integral therewith,
linkage means cooperating with said cam and said microswitch actuator which will only transmit a predetermined maximum displacement to said microswitch actuator without regard to variations in said cam height,
said linkage means including,
a first member,
said first member being pivotally supported,
said first member having a first follower which may contact said guide surface means,
a second member,
said second member pivotally supported on said first member,
said second member having a second follower always in contact with said cam,
said second member having an arcuate intermediate portion,
said second member having a projection integral therewith,
said projection coming into abutting contact with said first member upon pivotal movement of said second member towards said first member,
said arcuate portion of said second member coming into contact with said microswitch actuator when said cam comes in contact with said second follower.

References Cited in the file of this patent

UNITED STATES PATENTS

| | | |
|---|---|---|
| 1,092,266 | Howe | Apr. 7, 1914 |
| 1,507,493 | Leake | Sept. 2, 1924 |
| 1,960,020 | McGall | May 22, 1934 |
| 2,181,829 | Jeffrey | Nov. 28, 1939 |
| 2,874,238 | Jackson | Feb. 17, 1959 |

FOREIGN PATENTS

| | | |
|---|---|---|
| 1,100,715 | France | Apr. 6, 1955 |